United States Patent [19]

Catsimpoolas

[11] 4,448,150
[45] May 15, 1984

[54] ANIMAL HOUSING AND ACTIVITY MONITOR

[75] Inventor: Nicholas Catsimpoolas, Newton Center, Mass.

[73] Assignee: Trustees of Boston University, Boston, Mass.

[21] Appl. No.: 418,555

[22] Filed: Sep. 15, 1982

[51] Int. Cl.³ .................... A01K 1/03; A01K 45/00
[52] U.S. Cl. ............................ 119/1; 119/15; 119/17; 119/18; 250/221; 250/225
[58] Field of Search .................. 119/1, 15, 17, 18, 29, 119/16; 340/825.31, 573, 556, 686; 350/221, 227, 225; 356/375

[56] References Cited

U.S. PATENT DOCUMENTS

| | | | |
|---|---|---|---|
| 3,261,324 | 7/1966 | Conover | 119/16 |
| 3,283,744 | 11/1966 | Conover | 119/16 |
| 3,304,911 | 2/1967 | Hakata | 119/1 |
| 3,443,072 | 5/1969 | Mori | 250/225 |
| 3,633,001 | 1/1972 | Vajnovszky | 340/573 |
| 3,803,571 | 4/1974 | Luz | 119/1 |
| 3,877,420 | 4/1975 | Eagleson | 119/15 |
| 3,974,798 | 8/1976 | Meetze | 119/1 |
| 4,224,608 | 9/1980 | Lederer | 250/225 |
| 4,266,124 | 5/1981 | Weber et al. | 340/556 |
| 4,269,145 | 5/1981 | Rokhvarg | 119/16 |
| 4,337,726 | 7/1982 | Czekajewski et al. | 119/1 |
| 4,365,590 | 12/1982 | Ruggieri et al. | 119/15 |

OTHER PUBLICATIONS

*Science*, vol. 216, No. 4543, pp. 236–237, Apr. 16, 1982.
*Science*, vol. 219, No. 4586, p. 800, Feb. 18, 1983.
*Science*, vol. 216, No. 4568, pp. 100–101, Oct. 8, 1981.
*Science*, vol. 216, No. 4546, p. 610, May 7, 1982.
*Science*, vol. 218, No. 4573, pp. 622–623, Nov. 12, 1982.
Advertisement, Direct Mail, 2 pages, Columbus Instruments International Corporation, 950 N. Hague Ave., Columbus, Ohio 43204.

*Primary Examiner*—Gene Mancene
*Assistant Examiner*—Kris R. Schulze
*Attorney, Agent, or Firm*—Hamilton, Brook, Smith & Reynolds

[57] ABSTRACT

An animal activity housing and monitor includes several vertically displaced levels of animal cages 32 which are angularly disposed about a core 28. The core is mounted for rotation relative to the animal cages and for fiberoptic communication with the cages. The fiberoptic filaments provide for at least one light beam to be sequentially transmitted across the cages within each level for detecting animal position. Surrounding the central core are animal activity stations 36 which may be used for animal weighing, feeding, or experimentation. The cage support structure 24 is mounted for rotational positioning so that cages may be positioned at animal activity stations 36.

24 Claims, 9 Drawing Figures

ANIMAL HOUSING AND ACTIVITY MONITOR

DESCRIPTION

1. Field of the Invention

This invention relates to animal activity monitors in which lab animals are housed and observed.

2. Background

There is a growing demand for controlled environments in which animals may be housed for biological testing. Lab animals have been typically housed in linear stacks of cages, the conventional animal racks. Conventional animal racks have been the mainstay of lab testing for many years in spite of several deficiencies.

According to the general rules of experimental testing, a large test group produces more accurate results than a small test group. It is therefore beneficial to use as large an animal test group as one is able to use.

Conventional animal racks do not generally allow for the testing of a great many animals without large rooms specially set aside for animal housing. Each animal must be fed, cleaned and observed during the course of an experiment. This can require a great deal of time and effort. The amount of effort involved in maintaining animals for experimentation has tended to reduce the number of animal subjects used during experimentation.

Several drawbacks in conventional animal racks involve contact between the animals and the lab personnel conducting the experiment. Lab personnel are very often forced to handle test animals a large amount of the time in conventional systems. It is important in medical research to minimize the contact between possibly sick test animals and lab personnel. Any decrease in animal handling would therefore lessen the health problems associated with laboratory procedures. Additionally, in a simple animal rack arrangement, lab personnel breathe air which has been polluted by the presence of animals and animal waste. The conventional animal rack must be isolated and ventilated to restrict air passage from animals to lab workers. Therefore, large areas of the labs must be put aside for animal isolation since a large animal ventilation system is required.

Observation of animal subjects is required in behavioral experiments. Individual observation of animals in cages is a tedious occupation for lab personnel. Systems are available to automatically monitor a subject animal in a cage. Unfortunately, most systems currently available are very expensive in that they require a complete sensing system to be installed for each individual cage.

The requirement of testing large numbers of animals in a sanitary environment has produced a need for a substantially automatic and compact animal housing and activity monitor.

SUMMARY OF THE INVENTION

In accordance with principles of this invention, a cage assembly comprises at least two vertically displaced levels of animal cages, each level having a plurality of angularly displaced cages. In the center of the cages is a column-like core which is mounted at a central axis for rotation relative to the cage assembly. The central core carries electromagnetic communicating means which, in the preferred embodiment, is fiber optic filaments. The fiber optic filaments provide for at least one light beam to be sequentially transmitted across the cages within each level for detecting animal position within the cage.

In the preferred embodiment, a cage assembly composed of a modular cage support and cages is surrounded by a half-cylinder of animal activity stations. These stations may be used for animal experimentation, in addition to weighing and feeding. The cage support structure is mounted for rotation so that individual cages at each level may be brought adjacent to each animal activity station. The outer edge of each cage is equipped with automatic doors to allow for animal entry and exit from activity stations The stations themselves have a manual outer door to allow for animal handling by technicians.

In the preferred embodiment of the central core, fiber optic bundles for transmission of light to and from the cages terminate at different levels within the central core. In this way, the core can service different cage levels. In addition, air is exhausted from the cages through the central core and into an exhaust system. At the bottom of the central core is a terminal plate which allows for transmission and reception of light from a data collection plate mounted beneath the rotating central core. The data collection terminal plate and the fiber optic filaments are arranged to allow for animal observation of up to eight levels of cages.

The fiber optic filaments are illuminated by means of a laser. Laser light transmitted from the fiber optic filaments through the cages and back again is detected by means of a digitizing camera or other suitable photodetecting means. Preferably, the laser light is both infrared and polarized, allowing for accurate observation of the animals without disruption of experimentation.

In the preferred embodiment of the animal cages, fiber optic filaments are routed along cage walls with the first end positioned at cage walls for the reception or transmission of light through the interior of the cages, and the second end positioned for the transmission or reception of light to and from the central core. Additionally the cages, which are wedge-shaped, have at least one door mounted on the outer diameter wall which may be automatically activated for entry and exit of lab animals. Furthermore, the cages have perforation for air passage through the cage. Mirrors are mounted on the cage outer diameter inner wall to allow for reflection of laser light from the central core in order to further detect animal location and movement.

The animal activity monitor is controlled by an electronic control and actuation means. The electronic control means regulates light transmission through the fiber optic filaments, central core rotation for mechanical multiplexing of the fiber optic filaments and data recording of animal movement as disclosed by light transmission in and about the cages. In addition, the electronic computing means may be programmed to regulate movement of the animal cage structure and control animal activity within the animal activity stations.

DETAILED DESCRIPTION OF THE INVENTION

Figure 1:
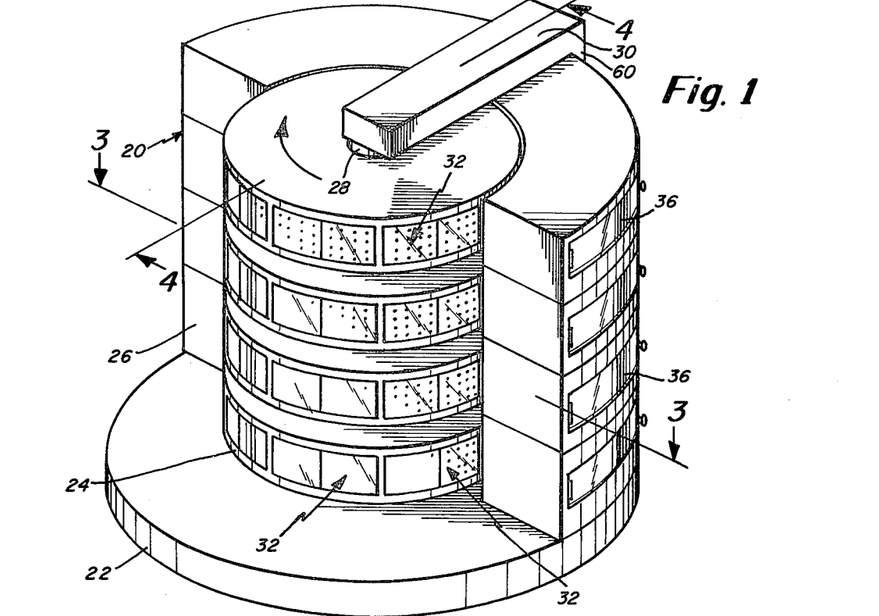
FIG. 1 is a perspective view of an animal housing and activity monitor assembly embodying this invention.

FIG. 1 is an overview of an assembled animal housing and activity monitor 20. Upon the base 22 rests a cage support structure 24 with cages 32. In the center of the cage structure 24 is a rotatable core 28 just barely visible above the cage structure in this view. Outside the cage structure is an animal activity structure 26.

This housing allows for automatic observation and care of a large number of animals. The rotatable cage support 24 is of modular design to allow an operator to have between one and eight levels of cages 32. On each level there are eight cages. The cages are serviced by both the central core 28 and the half circle of activity stations 26. The circular design of the base 22 allows for the automatic rotation of the cages and the servicing central core 28. Animal position and activity are sensed by the rotating central core 28. Cages intermittently rotate at a slow speed for positioning at activity stations 36.

Activity stations may be used for animal feeding, weighing or behavioral experiments. The animals housed in cages 32 are moved to and from the activity stations 36 automatically through automatic door mechanisms and electrifiable floors. In this way, animal handling and care activities are made substantially automatic. Animals may be removed from the structure for handling through manual doors 36 at the outer diameter of the activity structure 26.

It is preferable to minimize the exposure of laboratory personnel to test animals. For that reason the central core 28 acts as a mild vacuum to exhaust the cage air through exhaust duct 30 to proper filters or a ventilation area. Fresh air is brought in from the outside environment through cage wall perforations.

The rotating central core 28 carries fiber optic filaments for use in animal observation. These filaments optically connect to filaments within and about the cages in order to form a locating matrix of light sensors within each cage. An animal partially blocks the light sensor matrix and thereby discloses its location: Animal location and activity is discerned through recordation and analysis of fiber optic filament blockage. As the central core rotates, it is able to sequentially illuminate cages and sense animal location in all cages. In this way, the structure avoids costly duplication of sensing components since all sensing is done by the central column and a single set of components, comprising a laser, a digitizing camera and an electronic processor.

During animal monitoring, the central core is in constant use sensing animal location at a single cage on each level. The central core mechanically multiplexes the fiber optic filaments in order to serve all the cages. As the core rotates, sequential cages on each level are sensed. It is therefore possible to record animal activity for experimental purposes and to control that activity automatically through the rapid rotation of the central core and the slower rotation of cages outside the core. This monitoring is accomplished at a much reduced cost from the conventional linear cage structures now on the market.

Another advantage of the activity monitor 20 is that it is a modular structure. Levels of the cage support 24 and the animal activity stations 26 may be added as required. If only 8 animals are to be tested, only the first level is needed; if 16, then the second level is needed and so on. A maximum of eight levels is now designed for this embodiment. Each time additional levels are added, a longer central core must be installed. However, all other operating members are the same and do not need replacement. Therefore a large cost saving can be attributed to modular design built for expansion.

Figure 2:
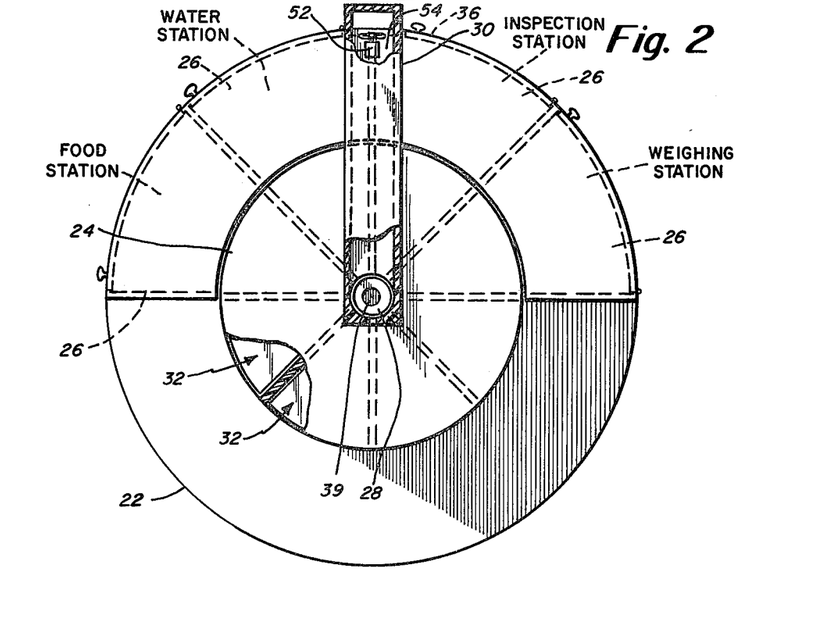
FIG. 2 is a plan view of the animal housing and activity monitor which is partially broken away to reveal interior detail.
Figure 3:
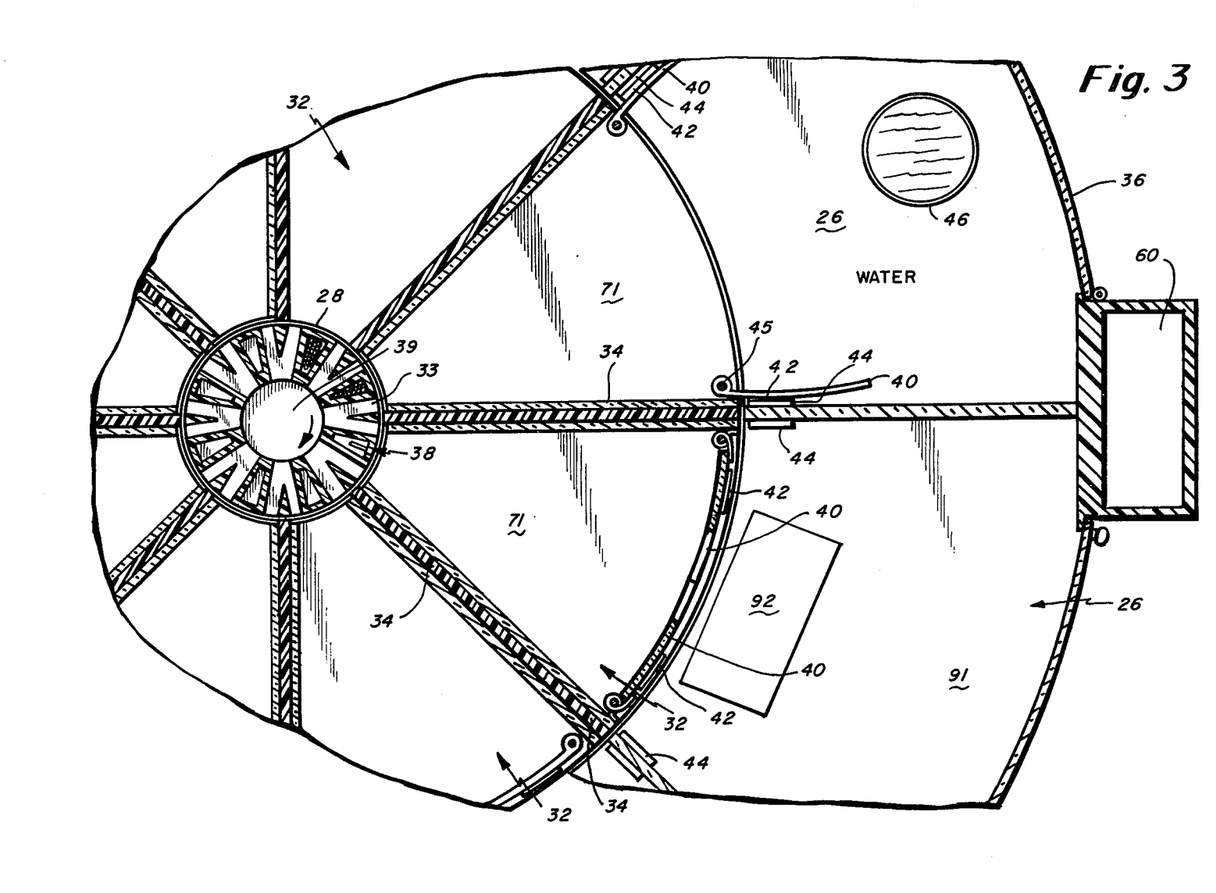
FIG. 3 is a partial horizontal cross-section of the animal housing and activity monitor, taken along the 3—3 of FIG. 1, which shows the spacial relationship of a central core, cages and animal activity stations.

FIG. 2 is a top view of the animal housing assembly with several small portions broken away to show interior detail. FIG. 3 is an enlarged partial horizontal cross-section of the animal housing activity monitor 20. The figure shows the central core, several cages 32 and two activity stations 26.

The segmented central portion of the animal activity monitor 20 is the cage support 24 in which cages 32 are inserted. Each cage is removable from the cage support structure 24 and may simply be slid out from that structure for cleaning or modification.

The central core 28 has an outer ring of fiber optic filaments and an inner passage 39 used for air exhause from the cages. Both the activity stations and the cages are perforated with air holes to allow for air intake, either from the environment as shown in this embodiment or, alternatively, from a surrounding air supply. The exhaust air is drawn from the passage 39 into the horizontal exhaust duct 30 by exhaust fan 52. The air may then be exhausted from an outside duct 60 through filters or other means in a manner to isolate the laboratory personnel from the animals. Air circulation is continuous as there are always several air ducts 33 facing a cage.

The central core is mounted for rotation in order to allow scanning of each horizontal cage level. In the center of the central core is the exhaust duct 39. The exhaust duct 39 is vented through radial ducts 33 to allow for air intake from the cages into the exhaust column. Surrounding the exhaust area 39 are several fiber optic bundles. The core is designed to accomodate up to eight fiber optic bundles; in this core, four fiber optic bundle areas are vacant. In addition, one bundle has terminated below the level of this cage, and it is shown as solid without fiber optic filaments. Another bundle is shown terminating at this level with fiber optic filaments leading to an interface between the column and the cage 32. Two bundles proceed upwards in the column to higher levels. As the column rotates, the fiber optic bundles rotate sequentially to cages and scan animal position and activity within those cages, as will be discussed below.

The rotating cage support structure 24 is surrounded, in a half-circle, by the animal activity stations 26. There are several different types of activity stations which may be used, depending on the nature of the experiment, and only several examples are shown here. In FIG. 2 the stations are labelled for food, water, animal inspection and weighing. When a cage is moved into position at such a station, the animal is released from its cage through automatic doors and may proceed into the animal station. From an animal activity station, manual doors 36 may be opened to allow laboratory personnel access to animals.

FIG. 3 shows two typical animal activity stations. The upper portion of the figure shows a water station 36 in which is placed water pool 46.

Figure 4:
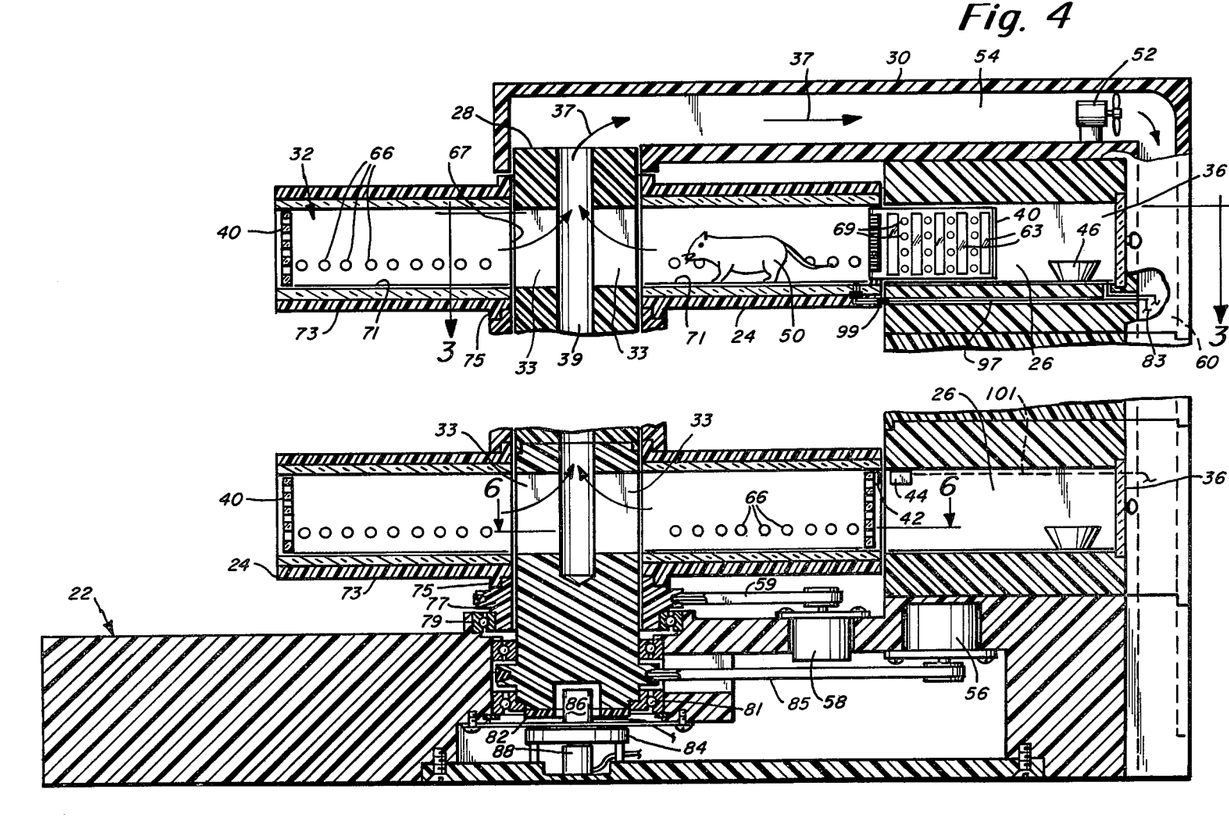
FIG. 4 is a vertical cross-section of the central core, animal cages and animal activity stations, taken along line 4—4 of FIG. 1.

FIG. 4 also shows the animal watering station 36. In order to move an animal to the water station 36, doors 40 are opened and electrifiable floor 71 is electrified by floor wires 97 from support column 60. The floor wires 97 bridge the gap between the station and the rotatable cage support at brush contacts 99. The animal activity station floor 81 may also be electrified through wires 83, from support column 60. When the station floor 81 is electrified, the animal leaves the activity station and returns to his cage where floor electrification has been terminated. Doors 40 are allowed to close when electromagnet 44 is turned off. Electromagnet 44 has wires 101 for activation as required to open the doors for animal movement.

The other station shown in FIG. 3 is a weighing station 91. In the weighing station an entering animal must cross from its cage into the animal activity station over a weighing pallet 92. The maximum weight put upon that pallet as the animal crosses it is the recorded weight of the animal. The animal is then allowed to return to the cage 32.

The cage 32 facing the water station 46 is shown with automatic doors in the open position. Doors 40 maintain a normally closed position through internal springs 45, preventing inadvertent animal exit. The doors 40 have magnets 42 placed within them; the magnets are attracted to open the doors when electromagnets 44, placed along activity station walls are activated. When electromagnets 44 are activated by an electrical current, the laboratory animal may leave its cage 32 to enter into an activity station. Laboratory animals are motivated to movement through the use of mildly electrifiable floors. Animal movement between cages and activity stations is thereby controlled. The doors to the weighing station 91 are shown closed so that the animal may not proceed from the cage to the weighing station. Duct 60 is also used for fiber optic and electrical leads as required for the electromagnets and experimentation within activity stations.

FIG. 4 is an elevational cross-section taken along line 4—4 of FIG. 1 showing two levels of the animal housing and activity monitor 20. The upper portion of FIG. 4 shows the topmost level of the assembly and the exhaust duct 30 placed on top of it. In the lower portion of FIG. 4 is the lowest level of the assembly with the assembly base 22 beneath it.

The center support structure 24 comprises a stack of modular sections. Each section of the modular support structure 24 is positioned by a centering ridge 75 set upon either a hub 77 or a lower support structure section. The hub 77 is mounted with bearings 79 for rotation relative to the base 22. The hub is driven by a motor 58, in support base 22, through a drive belt 59. The central column 28 is mounted to the base through bearings 81. The column is rotated by motor 56, also mounted in support base 22, through a drive belt 83.

The cages 32 within each support section fit snugly on a floor 73 within walls 34 (FIG. 3) so as to prevent outward cage movement during rotation.

It can be seen that the cage support structure 24 has been developed in a modular manner. The interlocking ridges 75 on the upper side and lower side of each cage level allow one to add levels as required. A support column 60 of the height required may be provided, and the stationary activity areas 26 may also be separately stacked. The central core is removed and replaced, depending on the number of levels required. In this embodiment, the maximum number of levels would be eight; therefore, the central core is depicted in FIG. 3 as having room for eight fiber optic bundles. Each fiber optic bundle terminates at a different horizontal cage level, allowing for maximum use of core area.

Alternatively, a tall or maximum height central core may be purchased as original equipment, and only utilized for the number of levels actually added to the rotating cage support 24.

The central core 28 is shown in FIG. 4 without fiber optic bundles for the purpose of clearly displaying the exhaust system. The exhaust air 37 from the cages travels up through the central core and into the exhaust duct 30. Fan 52 propels the exhaust through duct 60 from which the exhaust is filtered and exhausted to the environment.

As noted above, the rotating column serves to mechanically multiplex fiber optic filaments. There is one bundle of fiber optic filaments for each level. Through movement, the core can continuously scan every cage on a level. The central core 28 is mounted above data collection plates 82 and 84, which will be discussed in greater detail below. A digitizing camera 86 detects fiber optic filaments that have been illuminated through the cages by laser light from a laser 88. Since light travels through the fiber optics virtually instantaneously, light impulses from the laser can be transmitted and read through each cage on a very rapid basis. In this way, a tremendous savings in cost is made. It is possible through this system to measure animal movement and activity in many cages with the equipment that would have been necessary to observe animal activity in only one cage by conventional systems.

Figure 5:
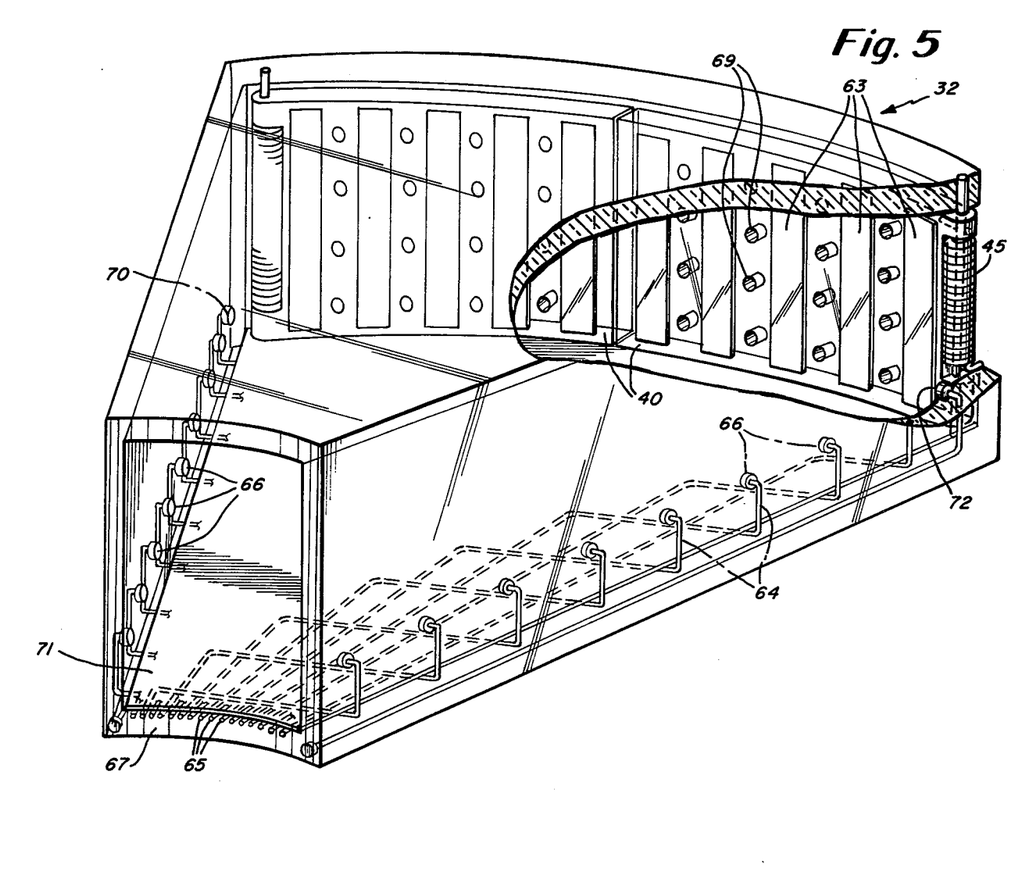
FIG. 5 is a perspective view of a transparent animal cage showing fiber optic filament positions.

FIG. 5 represents a perspective transparent view of a wedge-shaped cage 32 which fits into the cage support 24. Fiber optic filaments are routed along the lateral sides of the cages. A first end of each is located at a lens 66 for transmission or reception of light from the cage. A second end 65 is located for transmission or reception of light impulses from fibers in the central core 28. Light is provided in the cage by light sources 70 and 72, which are also fiber optic filaments routed for light reception from the inner core along the cage inner wall 67.

Light source 70 and light source 72 produce cross-polarized infrared light. The light is infrared so that it will not disturb the animals, and that they may not see it. The light is cross-polarized so that light from one light source will not be mistaken at the lenses 66 for light from the other source. The lenses or receptors are so polarized as to only detect light from one light source. Therefore, in this view the light detector 66 on the left side of the cage would detect light from light source 72, while those on the right side detect light from light source 70. If there is a lab animal in the cage, it will block light from being received by several of the light detecting filaments.

The microprocessor or computer which collects information from all the levels, serves to record the blocked light patterns and analyze the location of the lab animals. The light patterns are shown diagramatically in FIG. 6.

Figure 6:
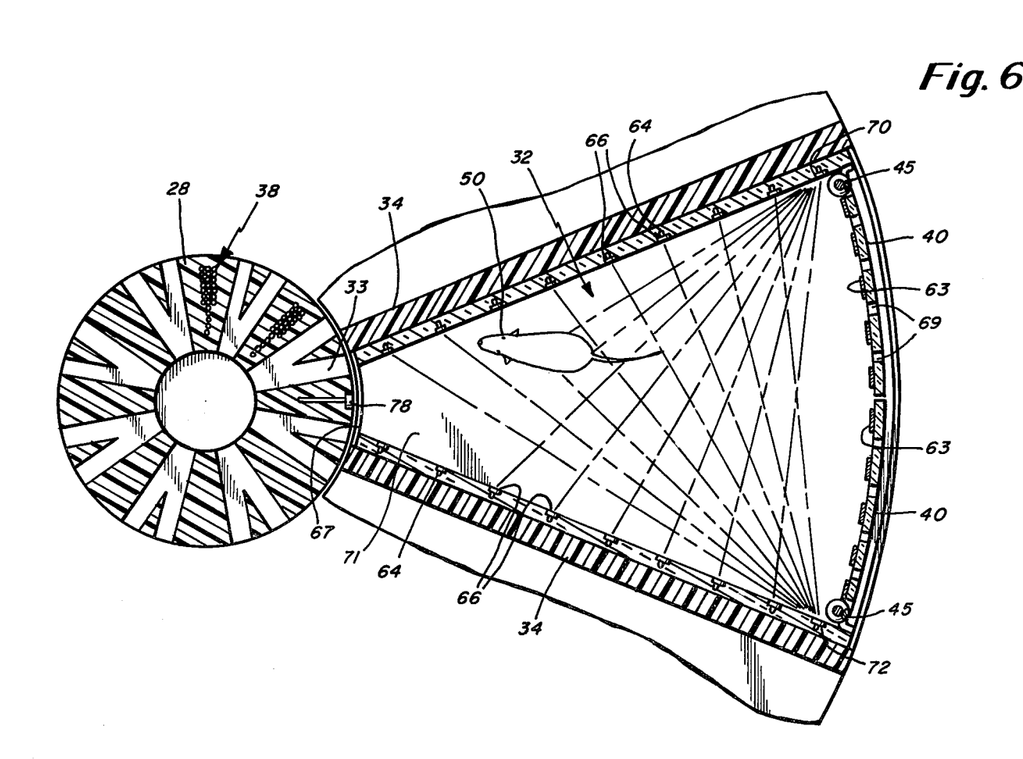
FIG. 6 is a top cross-section of a single cage and the central core. Visible in FIG. 5 is a schematic of a light pattern sensed through fiber optic filaments.

FIG. 6 shows a horizontal cross-section of the cage 32 and the central core 28. In this view, a fiber optic bundle 38 is depicted in the correct angular position for use in sensing a laboratory animal located in the cage. In FIG. 6, two of the inner most light detectors 66 on the right side of the cage have been blocked from light source 70 by the subject animal, while one of the detectors 66 on the left side of the cage has also been blocked from light source 72. The microprocessor analyzes this matrix to determine the animal location.

Several other aspects of the cage construction should be reviewed with FIG. 5. On the doors 40 are located both ventilation holes 69, and mirrors 63. The central core has a vertical array of fiber optic filaments and light sources which project light across the cage. The light is reflected from the mirrors into an array of detectors. Depending upon the animal height and location, reflection of light from the mirror will be blocked. It is therefore, possible to further discern animal location and movement by means of light reflection from the door mirrors 63. This may be seen more clearly in FIG. 7.

Figure 7:
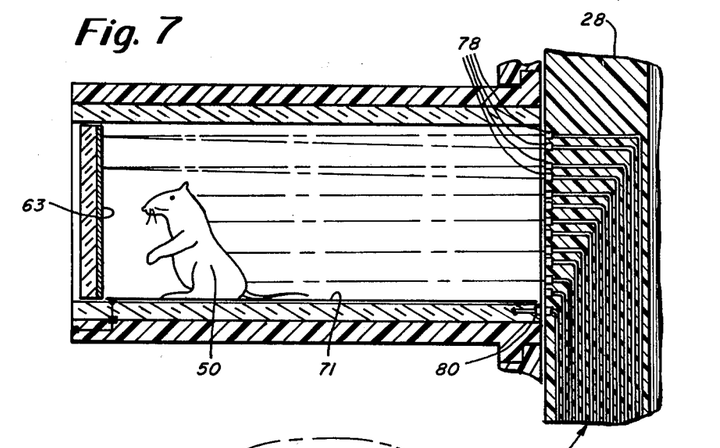
FIG. 7 is a vertical schematic cross-section of the central core and a single cage showing the vertical fiber optic filament arrangement.

FIG. 7 diagrammatically shows the vertical light detection system in which light is projected at several heights along the central core into the cage. Light is reflected from mirrors 63 in places where the lab animal 50 is not blocking the mirror. In the case of the vertical light detection array, each individual light detector 78 has its own light source joined with it. As the central core rotates, the lights flash on for each mirror within the cage. Therefore, a complete survey of each cage and all the cages on each level can be rapidly accomplished using a single linear array.

Returning once again to FIG. 5, the door spring 45 which maintains the automatic doors 40 in their normally closed position, is more particularly shown. Alternatively, the plastic of the cage may be cast in such a manner as to create an integral spring. The amount of spring tension required varies on the strength and size of the animals to be kept in the cages.

For clarity, the inner wall of the cage 71 is not shown in this view, but it is similarly constructed with air holes 69 to allow for air passage into the exhaust duct of the central core 28. The cage as a whole is transparent, to allow for light passage from the core, and viewing of the animals by observers.

Figure 8:
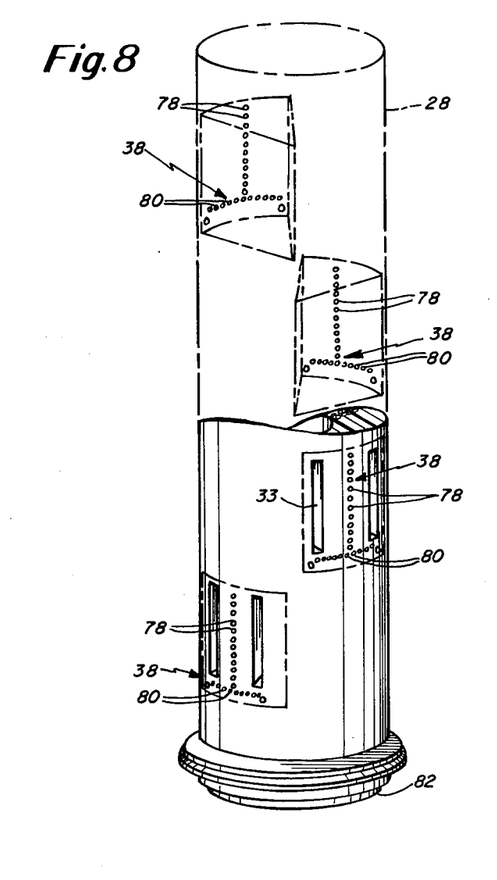
FIG. 8 is a transparent perspective view of the central core showing fiber optic filament placement on several horizontal levels.

FIG. 8 is a schematic representation of the central core. At each horizontal level of the central core different angular locations are occupied by the fiber optic filaments 38. This arrangement effectively uses central core space to allow for fiber optic servicing of several horizontal levels with a substantial number of filaments. A vertical group of filaments 78 allows for the discerning of the vertical position of the animal as shown in FIG. 7. A horizontal group of filaments 80 connects up filaments that run along the sides of the individual animal cages 32, to provide for accurate observation of the horizontal animal location as shown in FIG. 6. As the column periodically rotates each cage along, each horizontal level can be sequentially examined for animal activity. The column may either be stopped at a particular cage for observation, or continuously rotated in such a manner as to continuously observe all animals at virtually the same time.

In the lower section of FIG. 8, the central core is solidly shown. Air vents 33 allow for exhaust air from the cages 32 to enter into the central area of the column, with air being exhausted through the ventilation system. At the bottom of the column is located the fiber optic terminal plate 82, from which light is both transmitted and received to the data collection plate 84.

Figure 9:
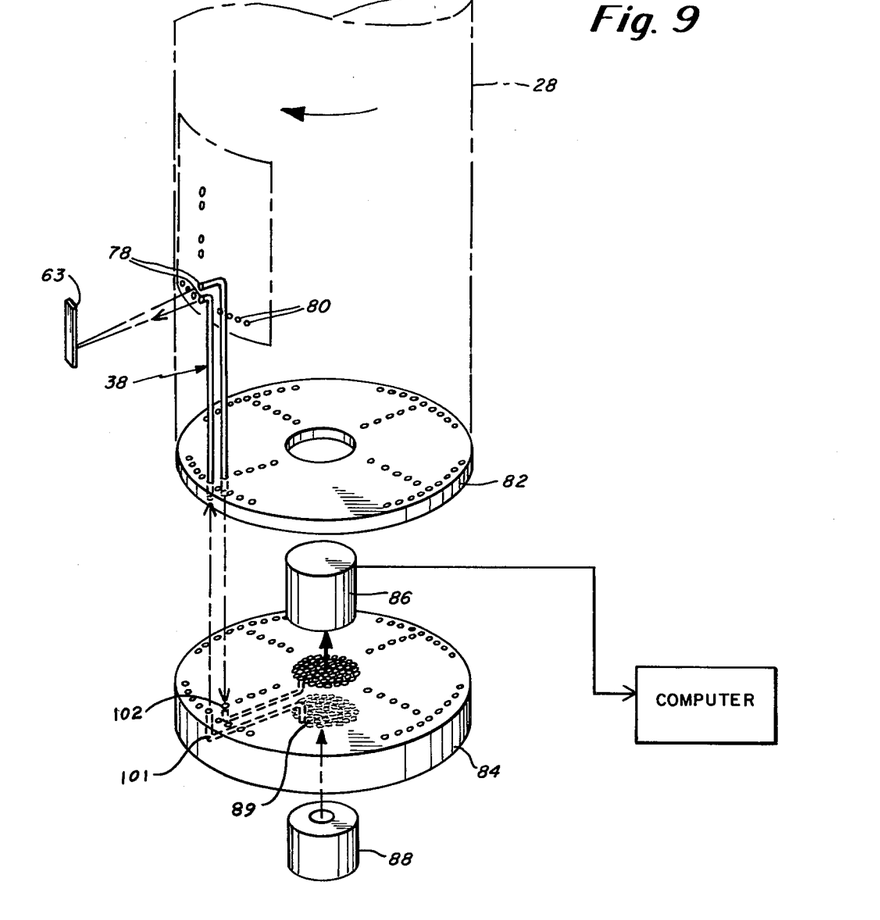
FIG. 9 is a schematic representation of the mechanical system for multiplexing the light signals from the light source to the rotating core and cages, and then to a stationary data collection device.

FIG. 9 is a diagramatic representation of the light source and data collection system. Light from the laser 88 is sent through data collection disk 84 and divided amongst multiple fiber optic filaments. A cluster of filaments 89 at the center of the disk receives the light from the laser. Light is transferred by short fiber optic filaments 101 to filament ends where light may be transmitted up through the fiber optic terminal plate 82 of the central core 28. The terminal plate 82 at the bottom of the central core moves with the core in a manner so as to furnish light to sections of the fiber optic filaments 38, as required for multiple cage scanning. In this embodiment, the lower data collection disk 84 is stationary, and the upper rotatable disk 82 moves at the same speed as the central core 28; alternatively, the lower data collection disk 84 may move at a faster speed than the central core, in order to more easily provide for continuous scanning of animal cages.

Mounted above the data collection disk 84 is the digitizing camera 86. Light received from fiber optic filaments in the central core 28 is transmitted down through fiber optic filaments 102 in the data collection disk. These filaments are routed to the central section of the disk where light is transmitted to the digitizing camera 86. The digitizing camera transforms the light impulses into electrical pulses from which the computer records the data.

As the central core rotates, various light pulses are fed into the digitizing camera as light is transmitted through the cages from the laser and fiber optic filaments. The patterns can be understood through the use of a computer which is programmed to analyze the light blockage pattern of lab animals, so as to record and analyze animal position all the time. This automated system relieves laboratory technicians of a tedious job of animal observation.

The laser light source used for the system projects infrared light which cannot be observed by the animals. A visible light system would disturb the animals and effect the experimental environment and might disrupt experimental results.

The computer which is used to analyze the light images from the cages is also programmed to control the activity of the subject lab animals. The animal movement to and from activity stations, as previously described, may be controlled by use of the computer. The computer can control the automated doors, the electrified flooring and any observation desired within the activity stations. It is also capable of controlling the rotation of the animal support structure so as to move animals from activity station to activity station. Through such a system as this, substantially automated care of lab animals may be accomplished. In this way, animal activity and movement is controlled automatically, eliminating the necessity of animal handling by laboratory personnel.

It has been shown that this system isolates the animals from the personnel, provides them with a healthy environment and controls their feeding, cleaning and other activities as required. The system, therefore, makes it possible to perform experiments with large experimental groups of animals with a minimum of care and environmental interaction.

While the invention has been particularly shown and described with reference to the preferred embodiments thereof, it will be understood by those skilled in the art, that various changes in form and detail may be made therein without departing from the spirit and scope of the invention as defined by the appended claims.

I claim:

1. Animal housing and activity monitor comprising:
   a. a cage assembly of at least two levels of vertically displaced animal cages, each level comprising a plurality of cages angularly displaced;
   b. a central column-like core having a central axis, mounted for rotation relative to the cage assembly, the core carrying electromagnetic communicating means;
   c. means responsive to the electromagnetic communicating means for providing at least one beam through seqential cages within each level; and,
   d. detecting means for receiving said beams for providing indications of the animals's position through the electromagnetic communicating means.

2. An animal housing and activity monitor comprising:
   a. a cage assembly of at least two levels of vertically displaced animal cages, each level comprising a plurality of cages angularly displaced;
   b. an activity station assembly comprising a plurality of animal activity stations displaced about the cage assembly;
   c. means for causing relative rotational movement between the cage assembly and the activity station assembly to sequentially position each cage of a level adjacent each activity station associated with that level;
   d. a door operable to provide access from each so positioned cage to each adjacent activity station; and
   e. electromagnetic communicating means for detecting animal position within said cages.

3. An animal housing and activity monitor as recited in claim 1 wherein the central core further comprises:
   a. fiber optic filaments bundles for transmission of light to and from the cages, the fiber optic filamants bundles terminating at different cage levels of the central core; and
   b. a venting area for exhausting air from the cages.

4. An animal housing and activity monitor as recited in claim 3 further comprising a laser for illumination of the fiber optic filaments mounted on the central core and the cages.

5. An animal activity monitor as recited in claim 3 wherein polarized light is projected through the fiber optic filaments in order to discern animal location and activity.

6. An animal activity monitor as recited in claim 3 wherein infrared light is projected through the fiber optic filament in order to discern animal activity and location without disruption of animal environment.

7. An animal housing and activity monitor as recited in claim 1 or 2 wherein the cage assembly further comprises a multiplicity of vertically displaced modular levels for the retention of cages, each level being divided circumferentially for the support of wedge-shaped cages.

8. An animal housing and activity monitor as recited in claim 1 wherein the animal cages further comprise:
   fiber optic filaments routed along cage walls with first ends positioned at the cage walls for the reception or transmission of light through the interior of the cages and second ends positioned for the transmission or reception of light to or from the central core.

9. An animal housing and activity monitor as recited in claim 1 or 2 wherein the animal cages are further characterized by:
   a wedge shape and at least one door mounted on a large diameter outer wall of the wedge-shaped cage for entry and exit of lab animals.

10. An animal housing and activity monitor as recited in claim 9 wherein an automatic system opens and closes cage doors utilizing magnets mounted on cage doors to allow for automatically controlled entry and exit of lab animals to or from the cages.

11. An animal housing and activity monitor as recited in claim 9 wherein the animal cages are further characterized by an electrifiable floor for the control of animal movement to and from the cages.

12. An animal housing and activity monitor as recited in claim 1 wherein a fixed partially cylindrical shell surrounds the cages and is divided into several animal activity stations.

13. An animal housing and activity monitor as recited in claim 2 or 12 wherein the floors of the animal activity stations are electrifiable for control of animal entry and exit from the animal activity station to the cages.

14. An animal housing and activity monitor as recited in claim 1 further characterized by:
   electronic control and actuation means for unified control of light transmission to and from the cages; central core rotation for mechanical multiplexing of the electromagnetic communicating means; and, means for recording data as to animal movement as disclosed by light transmission in and about the cages.

15. An animal activity monitor as recited in claim 14 wherein the electronic computing means analyzes and stores animal physiological data from various animal stations surrounding the cages.

16. An animal housing and activity monitor as recited in claim 14 further characterized by a fiber optic filament routing path through the central core in which core movement is synchronized by the electronic control with the fiber optic filament positions on the several cages for the purpose of transmission and reception of light, and said filament ends on the cages are so arranged as to discern the location and activity of animals contained by the cages.

17. An animal activity monitor for substantially automatic care and study of lab animals comprising:
   a. a base;
   b. a column-like central core mounted for rotation characterized by
      i. fiber optic filaments for transmission of light source to a subject animal's location wherein groups of the fiber optic filaments terminate at different heights of a central core;
      ii. a venting area for exhausting air from areas containing lab animals;
      iii. a rotating terminal section for transmission of light to or from the rotating core to a non-rotating data collection section;

c. a cylindrical rotatably mounted modular cage support structure surrounding the central core having a multiplicity of vertically displaced levels for the retention of cages, each vertically displaced level being divided angularly for the support of several circumferentially displaced animal cages;

d. substantially transparent wedge-shaped cages characterized by
  i. fiber optic filaments routed along cage walls with first ends embedded in the cage walls for the reception and/or transmission of light through the interior of the cages, and second ends embedded in cage walls for the transmission and reception of light from the central core;
  ii. at least one door mounted on each cage for entry and exit of lab animals, an automatic system for opening and closing said cage doors, and electric means for control of animal entry and exit to and from cages;

e. a partial, cylindrical shell at a fixed location surrounding the cage support structure divided into several modular animal activity stations, said stations having electric means of control of animal entry and exit;

f. electronic means for the control of the animal activity monitor characterized by
  control of light transmission to and from the cages through central core rotation; and analysis of data from a photoelectric receiver as to animal movement disclosed by light reception at fiber optic filament ends mounted about the cages;

g. a laser for illumination of the fiber optic filaments; and, h. at least one motor mounted to rotate the central core.

18. An animal activity monitor as recited in claim 8 or 17 wherein at least one of the animal activity stations contains a scale for automatic weighing of animals.

19. An animal activity monitor as recited in claim 8 or 17 wherein at least one of the animal activity stations contains food for the feeding of subject animals.

20. A method of monitoring and caring for lab animals which comprises the steps of:

a. rotating a column-like central core within a cylindrical cage structure;
  b. sequentially transmitting light from fiber optic filaments in the central core to fiber optic filaments in adjacent cages within the cage structure;
  c. illuminating cages within the cage structure from said filaments;
  d. receiving light from the cylindrical cage structure at the central core; and,
  e. transmitting light from the central core to a data collection system.

21. A method for monitoring and caring for lab animals which comprises the steps of;
  a. rotating a cylindrical cage support structure so that cages contained therein are sequentially moved to various animal activity stations;
  b. electrically opening exit and entry doors on cages to allow for animal movement to and from the animal activity stations; and,
  c. illuminating fiber optic filaments to receive and transmit light through animal cages for the detection of animal activity and location; and
  d. multiplexing means which permit detection of animal activity and location in multiple cages with a single detector means.

22. A method of monitoring and caring for lab animals as claimed in claim 20 or 21 further characterized by conversion of light signals to electrical signals for the purpose of analysis by electronic computing means for determination of animal activity and location.

23. An animal cage with animal monitoring means comprising:
  at least two light sources emitting oppositely polarized light,
  at least two receptor sensors that are polarized in order to allow them to distinguish between said polarized light sources, and
  detector means oppositely attached to said receptor sensors which record animal movement detected by said light source and receptors.

24. The animal cage detailed in claim 23 wherein said polarized light is infrared light.

* * * * *